P. & C. S. GANZHORN.
MEAT CHOPPER.
APPLICATION FILED FEB. 21, 1916.

1,215,362. Patented Feb. 13, 1917.

Philip Ganzhorn
Charles S. Ganzhorn
Inventors

UNITED STATES PATENT OFFICE.

PHILIP GANZHORN, OF CHICAGO, AND CHARLES S. GANZHORN, OF GLENELLYN, ILLINOIS.

MEAT-CHOPPER.

1,215,362.  Specification of Letters Patent.  Patented Feb. 13, 1917.

Application filed February 21, 1916. Serial No. 79,687.

*To all whom it may concern:*

Be it known that we, PHILIP GANZHORN and CHARLES S. GANZHORN, citizens of the United States, residing, respectively, at Chicago, Cook county, Illinois, and Glenellyn, in the county of Dupage and State of Illinois, have invented new and useful Improvements in Meat-Choppers, of which the following is a specification.

This invention relates to that class of meat choppers having a perforated plate through which the meat is forced and a revolving cutter working in front of the plate.

The object of the present invention is to provide an improved perforated plate whereby a better cutting action is produced, and also to provide a means for securing said plate which enables the same to be readily adjusted to take up wear.

With the objects stated in view, the invention consists in a novel combination and arrangement of parts to be hereinafter described and claimed, and in order that the same may be better understood, reference is had to the accompanying drawing forming a part of this specification.

In the drawing—

Figure 1:
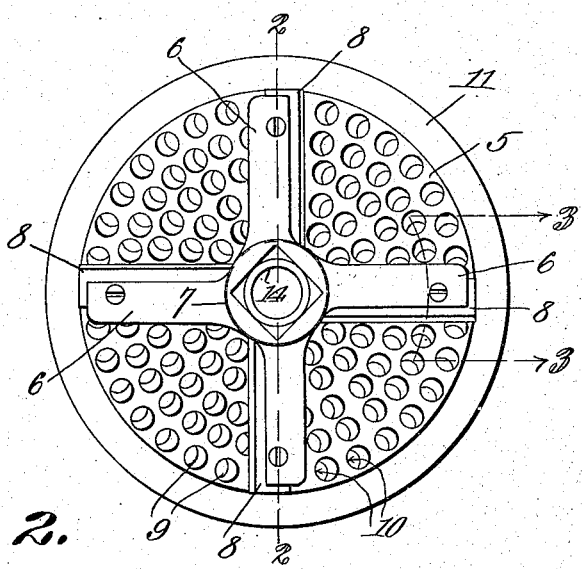
Figure 1 is an elevation of the invention.
Figure 2:
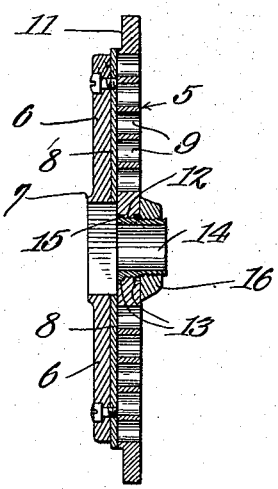
Fig. 2 is a vertical section on the line 2—2 of Fig. 1.
Figure 3:
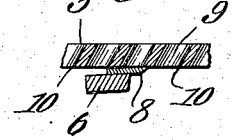
Fig. 3 is a sectional detail on the line 3—3 of Fig. 1.

Referring specifically to the drawing, 5 denotes the usual perforated plate through which the meat is forced by a feed screw, which latter has not been illustrated as it forms no part of the present invention. The perforations cause the meat to issue in the form of short strands or threads which are cut by a revolving cutter, the latter comprising a series of arms 6 radiating from a hub 7 and each armed with a cutting blade 8. The cutter is positioned in front of the plate 5 in proximity thereto to cut the meat into small pieces, the blades being in contact with the plate.

The improvement in the plate 5 consists in arranging the perforations 9 thereof at an oblique angle to the cutting edges of the blades 8. It will thus be seen that instead of the meat strands entering the perforations at a right angle to the blades, they enter at an oblique angle, and a portion 10 of the edges of the perforations point toward the cutting edges of the blades and coöperate therewith to obtain a shearing cut. This arrangement gives a more effective cutting action, and also renders the chopper easier to operate, less power being required. The perforations are not tapered but are of a uniform diameter throughout their entire length, whereby wear is reduced to a minimum.

The plate 5 has at its periphery a slight reduction in width on one side, as indicated at 11, which is for the purpose of preventing the knives from wearing a recess in the face of the plate. When the plate wears down flush with the part 11 it may be reversed.

The plate 5 is also mounted so that it may be reversed as hereinbefore described. The plate has a central aperture 12 which is rabbeted at its ends as indicated at 13. In this aperture is mounted a sleeve or hub member 14 having an end flange 15 adapted to seat in either one of the rabbets. The flange is on one end of the sleeve, and the other end of the latter is threaded to take a nut 16. The plate is fixed to the sleeve by the nut, it being clamped between the latter and the flange, the latter seating in the rabbet on that side of the sleeve opposite the side against which the nut is screwed. As the rabbets are at both ends of the aperture, it will be seen that the plate can be removed and reversed upon removing the nut.

We claim:—

A meat chopper having a perforated plate and a rotary cutter working over the same, said plate having a central aperture which is rabbeted at both ends, a sleeve seating in the aperture and having an end flange seating in one of the rabbets, and a nut screwed on the sleeve against one side of the plate, said plate being reversible on the sleeve and clamped between the flange and the nut.

In testimony whereof we affix our signatures.

PHILIP GANZHORN.
CHARLES S. GANZHORN.

Copies of this patent may be obtained for five cents each, by addressing the "Commissioner of Patents, Washington, D. C."